United States Patent
Fan et al.

(10) Patent No.: US 11,934,318 B2
(45) Date of Patent: Mar. 19, 2024

(54) MULTI-HOST MEMORY SHARING

(71) Applicant: XConn Technologies Holdings, Inc., San Jose, CA (US)

(72) Inventors: Yan Fan, Los Altos Hills, CA (US); Kevin Rowett, Cupertino, CA (US); Lawrence Hileman, San Jose, CA (US)

(73) Assignee: XConn Technologies Holdings, Inc., San Jose, CA (US)

( * ) Notice: Subject to any disclaimer, the term of this patent is extended or adjusted under 35 U.S.C. 154(b) by 0 days.

(21) Appl. No.: 18/206,564

(22) Filed: Jun. 6, 2023

(65) Prior Publication Data

US 2023/0393990 A1    Dec. 7, 2023

Related U.S. Application Data

(60) Provisional application No. 63/349,935, filed on Jun. 7, 2022.

(51) Int. Cl.
*G06F 12/10* (2016.01)

(52) U.S. Cl.
CPC .................. *G06F 12/10* (2013.01)

(58) Field of Classification Search
CPC ........................................ G06F 12/10
See application file for complete search history.

(56) References Cited

U.S. PATENT DOCUMENTS

| | | | |
|---|---|---|---|
| 6,711,170 B1 | 3/2004 | Brown | |
| 7,779,286 B1 | 8/2010 | Pritchard | |
| 9,672,151 B1 * | 6/2017 | Ma | G06F 3/0619 |
| 10,915,486 B1 | 2/2021 | Khan | |
| 2001/0032282 A1 | 10/2001 | Marietta | |
| 2004/0105384 A1 | 6/2004 | Gallezot | |
| 2014/0052938 A1 | 2/2014 | Kim | |
| 2014/0064271 A1 | 3/2014 | Boden | |
| 2015/0026384 A1 * | 1/2015 | Maitra | G06F 12/1081 |
| | | | 710/313 |
| 2015/0109024 A1 | 4/2015 | Abdelfattah | |
| 2015/0373115 A1 * | 12/2015 | Breakstone | G06F 11/2069 |
| | | | 709/217 |
| 2018/0026638 A1 | 1/2018 | Atsatt | |
| 2019/0065427 A1 | 2/2019 | Wortman | |
| 2019/0197006 A1 | 6/2019 | Teh | |
| 2019/0354481 A1 * | 11/2019 | Ono | G06F 9/467 |
| 2021/0240655 A1 * | 8/2021 | Das Sharma | G06F 13/1626 |
| 2022/0188178 A1 * | 6/2022 | Bert | G06F 3/0619 |
| 2022/0318181 A1 * | 10/2022 | Cannata | G06F 9/4411 |
| 2023/0027178 A1 | 1/2023 | Shah | |
| 2023/0114164 A1 * | 4/2023 | Pal | G06F 15/7807 |
| | | | 711/118 |

* cited by examiner

*Primary Examiner* — Prasith Thammavong

(74) *Attorney, Agent, or Firm* — Van Pelt, Yi & James LLP

(57) ABSTRACT

A system including a fabric manager, a memory mapper, and a switch is described. The memory mapper receives and stores mapping information from the fabric manager that maps memory locations in a plurality of hosts to corresponding memory locations in a plurality of physical devices. The switch receives at least a portion of the mapping information from the memory mapper, receives a request from a host, and accesses memory that is identified by the request on a physical device of the plurality of physical devices.

15 Claims, 4 Drawing Sheets

MULTI-HOST MEMORY SHARING

CROSS REFERENCE TO OTHER APPLICATIONS

This application claims priority to U.S. Provisional Patent Application No. 63/349,935 entitled MULTI-HOST MEMORY SHARING filed Jun. 7, 2022 which is incorporated herein by reference for all purposes.

BACKGROUND OF THE INVENTION

In order to accommodate the volume and speed at which data are produced by, stored, and exchanged between hosts (e.g. processors) in a system, interconnects (e.g. switches) are desired to have a high data exchange rate. For example, hosts and physical memory devices are coupled to ports of the switch. Each host is typically assigned to a dedicated physical memory device. Through the switch, a host on one port of the switch connects to its dedicated physical memory device on another port of the switch. Although this allows for hosts to use physical memory devices, the desired data exchange rates and latencies may not be achieved. This failure may result in critical bottlenecks to system performance. Consequently, improved mechanisms for storing and transferring data are desired.

BRIEF DESCRIPTION OF THE DRAWINGS

Various embodiments of the invention are disclosed in the following detailed description and the accompanying drawings

DETAILED DESCRIPTION

Figure 1:
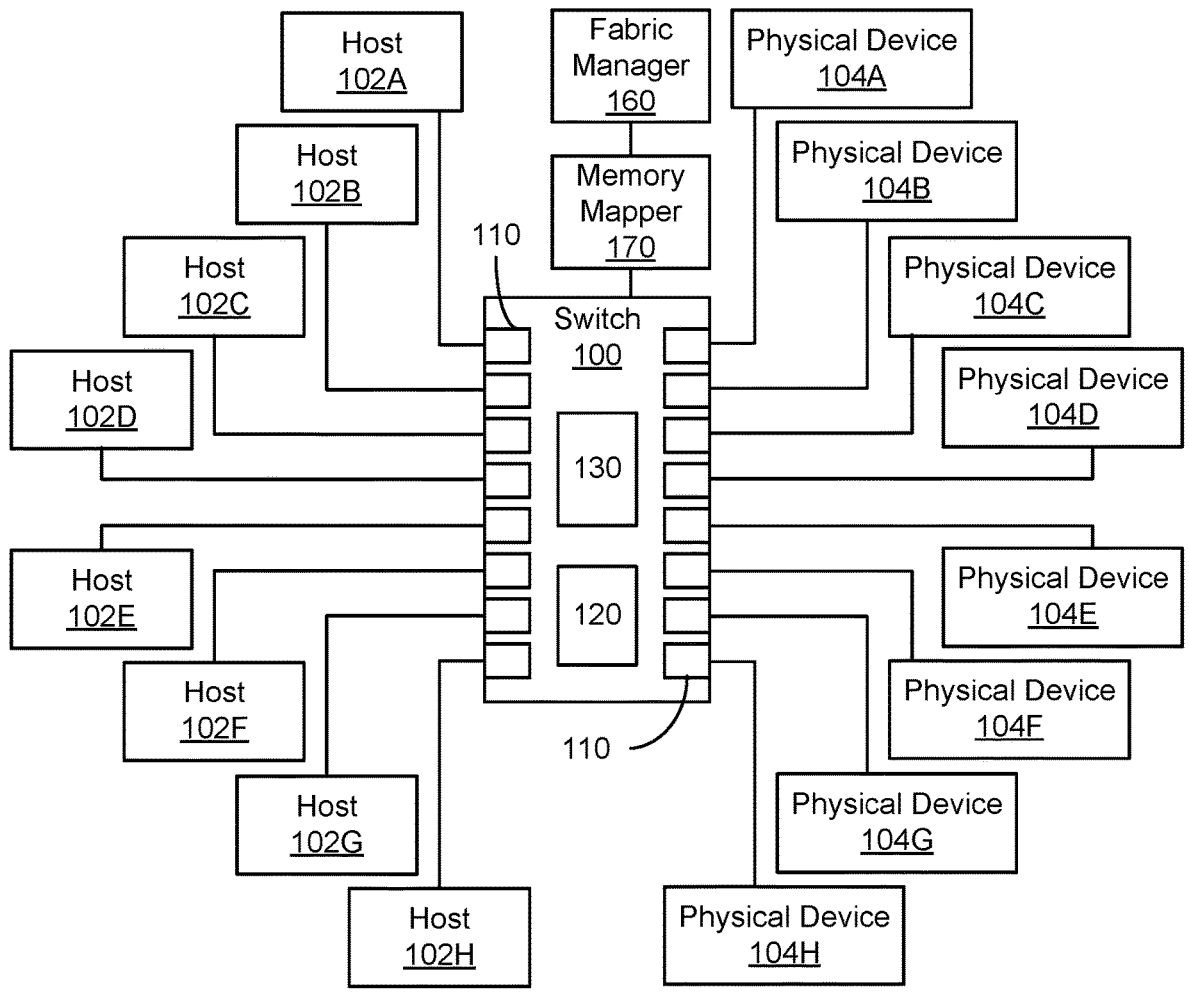
FIG. 1 depicts an embodiment of a switch configured for shared memory.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In some networks, hosts (e.g. processors such as CXL hosts) are connected to physical devices (e.g. physical memory devices such as CXL memory devices) via interconnects (e.g. switches). Each host and each physical device is connected to the switch via a port. Each host on one port is typically assigned to a dedicated physical memory device on another port. Although this allows for hosts to use physical memory devices, the desired data exchange rates and latencies may not be achieved. This may adversely affect system performance. Therefore, improved mechanisms for storing data and transferring data between hosts are desired.

A system including a fabric manager, a memory mapper, and a switch is described. The memory mapper receives and stores mapping information from the fabric manager. The mapping information maps memory locations in hosts to corresponding memory locations in physical devices. The switch receives at least a portion of the mapping information from the memory mapper, receives a request from a host, and accesses memory that is identified by the request on one or more of the physical devices. In some embodiments, the memory mapper includes an address table configured to translate between the memory locations in the hosts and the corresponding memory locations in the physical devices. The request may be a compute express link (CXL) request, the host may be a CXL host, and the physical device may be a CXL memory device. In some embodiments, the at least the portion of the mapping information received by the switch maps a particular set of memory locations in the host to a corresponding set of corresponding memory locations in at least a first physical device and a second physical device. In some embodiments, the mapping information maps a portion of the physical device to each of the hosts.

The switch may receive an additional request from an other host. The switch also receives additional mapping information from the memory mapper. The additional mapping information maps additional memory locations in the other host to additional corresponding memory locations in the physical device. The switch accesses additional memory on the physical device for the other host. The additional memory is identified by the additional request on the physical device. Thus, the host and the other host share the physical device. In some embodiments, the memory and the additional memory include shared memory location(s) on the physical device. The shared memory location(s) are accessible by only one of the host and the other host at a particular time. Thus, the switch may be configured such that the host and the other host transfer information through the shared memory location(s). In some such embodiments, the switch is configured to allow the other host to access the shared memory location(s) only if the shared memory location(s) are not attached to the host.

A method is also disclosed. The method may be used for storing data, reading data, transferring data and/or other operations in connection with physical devices. The method includes receiving, at a switch from a memory mapper, at least a portion of mapping information. The mapping information is received at the memory mapper from a fabric manager. The memory mapper stores the mapping information, for example in an address table. The mapping information maps memory locations in hosts to corresponding memory locations in physical devices. The switch also receives a request from a host. Memory on a physical device that is identified using the request is accessed via the switch. The hosts may be CXL hosts and the physical devices may be CXL physical devices.

In some embodiments, the at least the portion of the mapping information received by the switch maps a particular set of memory locations in the host to a corresponding set of corresponding memory locations in multiple physical devices. Thus, the mapping information may map a portion of the physical device to each of the hosts.

In some embodiments, the method also includes receiving, at the switch, an additional request from an other host. The switch also receives additional mapping information from the memory mapper. Using the additional mapping information, the additional memory on the physical device and identified using the additional request is accessed via the switch for the other host. Thus, the host and the other host share the physical device. In some embodiments, the memory and the additional memory include at least one shared memory location on the physical device. The at least one shared memory location is accessible by only one of the host and the other host at a particular time. Thus, the switch may be configured such that the host and the other host transfer information through the at least one shared memory location. In some embodiments, the switch is configured to allow the other host to access the at least one shared memory location only if the at least one shared memory location is not attached to the host.

FIG. 1 depicts an embodiment of switch 100 configured for shared memory. Switch 100 includes ports 110 (only two of which are labeled), scheduler 120, and switch memory fabric 130. In some embodiments, other components may be provided in the switch but are not shown for clarity. Switch 100 is coupled with memory mapper 170 and with fabric manager 160 (via memory mapper 170 in the embodiment shown in FIG. 1). Hosts 102A, 102B, 102C, 102D, 102E, 102F, 102G, and 102H (collectively or generically, host(s) 102) are shown coupled to ports 110. Similarly, physical devices 104a 104B, 104C, 104D, 104E, 104F, 104G, and 104H (collectively or generically physical devices 104) are shown coupled to other ports 110. Physical devices 104 may be physical memory devices, such as CXL memory devices. Hosts 102 may include processors and may be CXL hosts.

Fabric manager 160 provides mapping information for hosts 102 and physical devices 104. To do so, fabric manager 160 translates between memory locations in hosts 102 and corresponding memory locations in physical devices 104. Thus, the mapping information includes the translation between host memory locations (e.g. host addresses) and physical device memory locations (e.g. physical device addresses). Memory mapper 170 stores the mapping information and provides the mapping information to switch 100 for use. In some embodiment, memory mapper 170 uses an address translation table to store the mapping information. In some embodiments, application programming interfaces (APIs) are utilized to register hosts 102, allocate memory in physical devices 104 to hosts 102, attach allocated memory in physical devices 104 to hosts 102, and free allocated memory in physical devices 104 from hosts 102, as well as for other operations.

Switch 100 allows for communication between hosts 102 and physical devices 104. Further, switch 100 allows for hosts 102 to communicate with each other via physical devices 104. In particular, switch 100 receives mapping information from memory mapper 170 and uses this information to facilitate communication between hosts 102 and physical devices 104. Using switch 100, each host 102 may utilize multiple physical devices 104. For example, host 102A may store data to and read data from physical devices 104C and 104D. Further, multiple hosts 102 may share a single physical device 102. For example, hosts 102A and 102C may both store data to and read data from a physical device 102G.

In operation, hosts 102 are registered with memory mapper 170 and/or fabric manager 160. Consequently, the memory locations in each host 102 are known to the system. Further, memory locations in one or more physical devices 104 are allocated to individual hosts 102. The memory locations allocated to a particular host 102 are usable by that host 102. In some embodiments, a particular physical device 104 may have memory allocated to multiple hosts 102. Thus, multiple hosts 102 may share a physical device 104. The memory locations allocated to each of the hosts may be completely separate. In such cases, each host 102 uses different memory locations in the same physical device 104. Some or all of the memory locations (co-allocated memory locations) may be allocated to multiple hosts 102. In such cases, the multiple hosts 102 share the same (co-allocated) memory locations. However, only one host 102 can access these co-allocated memory locations at a time. The allocation and registration tasks may be accomplished via APIs.

For example, all hosts 102 are registered to function with switch 100. In this example, memory locations in physical devices 104F and 104G are allocated to a particular host 102C. As a result, memory locations for host 102C have corresponding memory locations in physical devices 104F and 104G. The translation between the memory locations for hosts 102 and the corresponding memory locations in physical devices 104 is determined by fabric manager 160 and stored by memory mapper 170.

Switch 100 receives requests from hosts 102 to access one or more physical devices 104. Using mapping information from memory mapper 170, switch 170 provides access to the correct corresponding memory locations in physical device(s) 104. In some embodiments, this may be considered to translate memory locations from the local domain (e.g. for the host) to the global domain for the system. In some embodiments, multiple In the example above, host 102C may request switch 100 to access particular of its memory locations. In some embodiments, this request takes the form of a CXL memory transaction. The request identifies the memory locations in host 102C desired to be accessed (e.g. written to or read from). Physical devices 104F and 104G each has memory allocated to host 102C. The corresponding memory locations are determined using mapping information from memory mapper 170. In some embodiments, memory mapper 170 performs the translation from the host memory locations to the corresponding memory locations in physical device(s) 104F and/or 104G using an address translation table or other analogous technique. In such embodiments, memory mapper 170 provides the corresponding memory locations in physical device(s) 104F and/or 104G to switch 100. In some embodiments, switch 100 determines the corresponding memory locations in physical device(s) 104F and/or 104G using mapping information provided by memory mapper 170. The corresponding memory locations in physical device(s) 104F and/or 104G may be accessed (e.g. read from or written to) by physical device 102C. Thus, host 102C may utilize multiple physical devices 104F and 104G.

In another example, physical device 104D may have memory allocated to each of hosts 102E and 102F. Thus, hosts 102E and 102F may each provide requests to switch 100. A request from host 102E identifies memory locations for host 102E. A request from host 102F identifies memory locations for host 102F. The corresponding memory locations for requests from host 102E and from host 102F are determined using mapping information in memory mapper 170. This determination may be made by memory mapper 170 or switch 100. The corresponding memory locations in physical device 104D may be accessed (e.g. read from or written to) by hosts 102E and 102F. Thus, hosts 102E and 102F may share physical device 1044D. In some cases, the same (co-allocated) corresponding memory locations in physical device 104D are accessible by both host 102E and host 102F. However, only one host 102E or 102F can access the co-allocated memory locations at a time. Because hosts 102E and 102F can both access the co-allocated memory locations, hosts 102E and 102F can communicate through physical device 104D. For example, host 102E may store data in the co-allocated memory locations of physical device 104D. Host 102F may then read the data from the co-allocated memory locations. Thus, hosts 102E and 102F transfer data (i.e. communicate) via physical device 104D.

Using switch 100, memory in physical devices 104 may be shared by hosts 102. Multiple hosts 102 may use a single physical device 104 and a single host 102 may use multiple physical devices 104. As a result, latencies and bottlenecks in memory usage may be reduced. Thus, storage and reading of data may be more efficient and performance may be improved.

Figure 2:
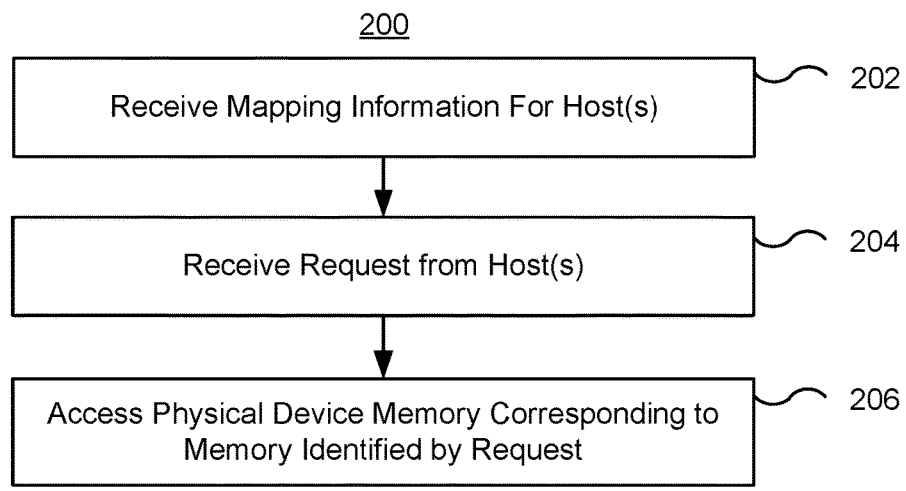
FIG. 2 is a flow-chart an embodiment of a method for using a switch configured for shared memory.

FIG. 2 is a flow-chart depicting an embodiment of method 200 for using a switch configured for shared memory. For simplicity, only some steps are shown. Further, portions of method 200 may be performed in another order, including but not limited to in parallel. Method 200 is also described in the context of a single switch 100, a particular number of hosts 102, and a particular number of physical devices 104. However, method 200 may be used for other switches, hosts, and/or physical devices as well as for other number(s) of switch(es), host(s) and/or physical devices.

Mapping information for a host is received at a switch, at 202. The mapping information may be received from a memory mapper. The receipt may be in response to a request from the host to the switch. For example, in response to receiving the request from the host, the switch may query the memory mapper for the mapping information and receive the mapping information in response to the query. In some embodiments, the mapping information is provided from the memory mapper to the switch at another time.

The switch also receives a request from a host, at 204. The request identifies memory locations for the host. Memory on a physical device accessed through the switch, at 206. Also at 206, the corresponding memory in the physical device for the host memory that is identified by the request is determined. This corresponding memory may then be accessed via the switch at 206. Thus, through the switch, the hosts may access memory in physical devices.

For example, mapping information for hosts 102 and physical devices 104 is provided to switch 100, at 202. The mapping information provides a translation between memory locations in hosts 102 and the corresponding memory locations in physical devices 104.

A request from host 102 is received at switch 102, at 204. The request identifies the host's memory locations for the request. Via switch 100, the corresponding memory locations in physical device(s) 104 are accessed. This may include determining the corresponding memory locations in physical device(s) 104 using the mapping information provided in 202. Thus, hosts 102 may utilize and share multiple physical devices 104.

Using method 200, memory in physical devices 104 may be shared by hosts 102. Multiple hosts 102 may use a single physical device 104 and a single host 102 may use multiple physical devices. As a result, latencies and bottlenecks in memory usage may be reduced. Thus, storage and reading of data may be more efficient and performance may be improved.

Figure 3:
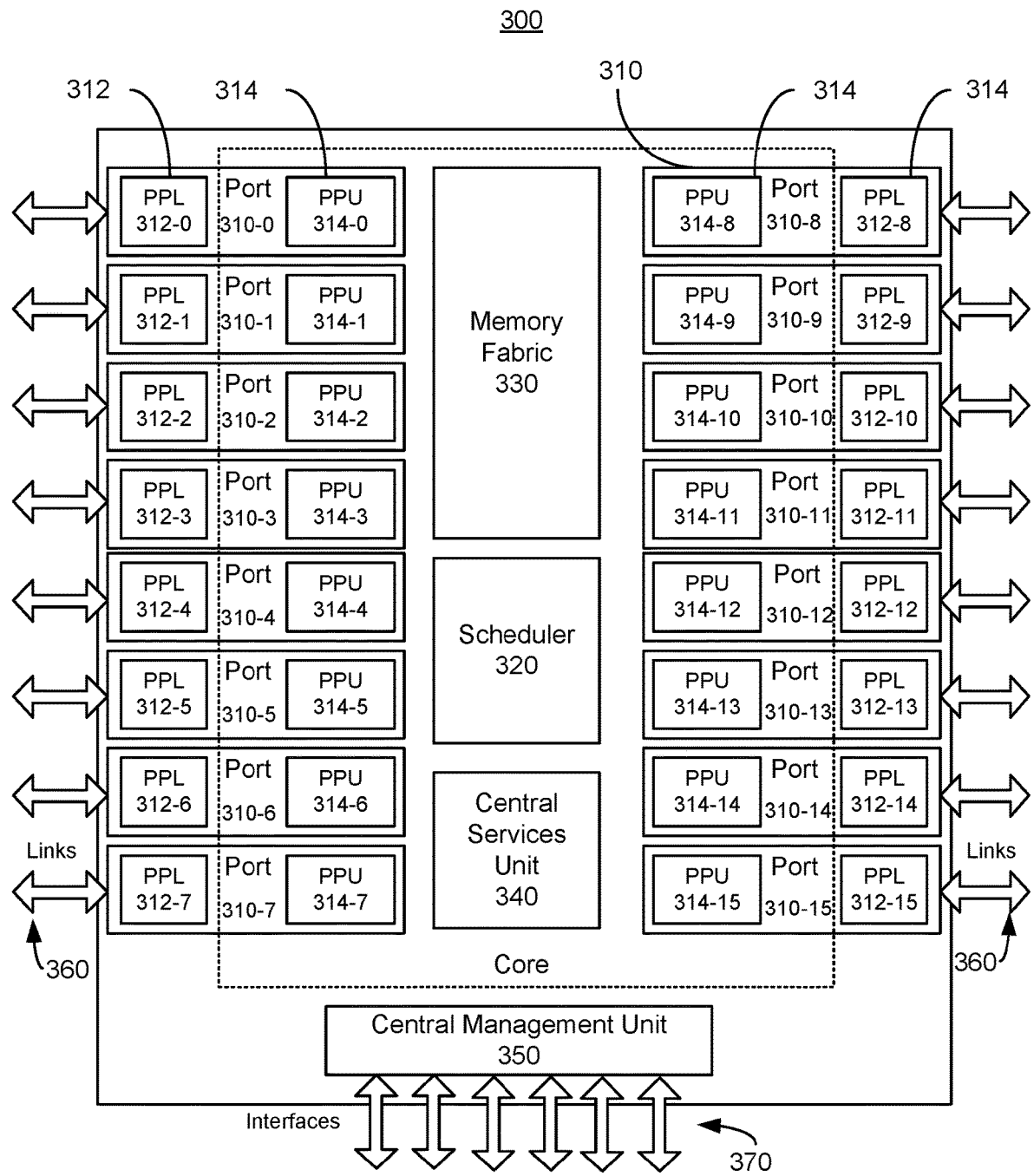
FIG. 3 depicts an embodiment of a switch including a multibank memory and usable with shared memory.

FIG. 3 depicts an embodiment of switch 300 including a multibank memory and usable with shared memory. Switch 300 corresponds to switch 100 and may be used with memory mapper 170, fabric manager 160, hosts 102, and physical devices 104. For clarity, only some portions of switch 300 are shown. Switch 300 may be a PCIe switch and is described in the context of PCIe. However, in some embodiments, switch 300 may be another type of switch, such as a CXL switch.

Switch 300 is analogous to switch 100. Consequently, similar components have analogous labels. Thus, switch 300 includes sixteen ports 310-0, 310-1, 310-2, 310-3, 310-4, 310-5, 310-6, 310-7, 310-8, 310-9, 310-10, 310-11, 310-12, 310-13, 310-14, and 310-15 (collectively or generically ports 310). Ports 310, scheduler 320 and memory fabric 330 are analogous to ports 110, scheduler 120 and memory fabric 130, respectively. Also shown are central services unit 340, central management unit 350, PCIe links 360 for ports 310 and interface 370.

Central services unit 340 includes one or more functional units. For example, central services unit 340 may include one or more of: a bootstrap controller that is used at startup to set internal registers, repair internal memories and initialize switch 300; a clock generator that generates a core clock, generates derived clocks, distributes the clock signals to the appropriate units and, in some embodiments, generates clock enables to gate clocks when the corresponding units are not in operation; reset generator that provides the proper resets during initialization and soft resets; power manager that receives power management messages and facilitates entrance to and exit from the PCIe link; interrupt processor that generates the interrupts; error processor that detects errors and generates error messages; register access controller that responds to requests (e.g. from central management unit 350); and TLP generator that generates TLPs for performance analysis and debugging. In some embodiments, one or more functional units may be omitted and/or performed in another manner/by another component.

Central management unit 350 provides access via the corresponding interfaces 370. For example, central management unit 350 may be used to access Flash memory (not shown) through one of the interfaces 370 shown during initialization. Central management unit 350 may also provide slave interface to access on-chip registers, provide communication to switch 300 during debugging and testing, and send/receive other signals via the interfaces 370.

Each port 310 performs some processing of packets in the embodiment shown. Thus, each port 310 includes a PCIe port logic (PPL) and packet processing unit (PPU). For other types of switches, other port logic may be used. PPLs 312-0, 312-1, 312-2, 312-3, 312-4, 312-5, 312-6, 312-7, 312-8, 312-9, 312-10, 312-11, 312-12, 312-13, 312-14, and 312-15

(collectively or generically PPLs 312) and PPUs 314-0, 314-1, 314-2, 314-3, 314-4, 314-5, 314-6, 314-7, 314-8, 314-9, 314-10, 314-11, 314-12, 314-13, 314-14, and 314-15 (collectively or generically PPUs 314) are shown. PPL 312 and PPU 314 perform various functions for port 310. Although described as separate functional units, in some embodiments, the functions of PPL 312 and/or PPU 314 may be performed in another manner and/or by another device.

PPL 312 interfaces with the devices coupled via links 360. Link 360 may be a PCIe x 16 link. Thus, PPLs 312 may interface with GPUs, TPUs, FPGA Accelerators, and other CPUs through links 360. In some embodiments, the link speed can run up to 32 Gb/s Per lane, and the total aggregated bandwidth is 512 Gb/s Per Port. Thus, each port 310 has sixteen lanes in the embodiment shown. In some embodiments, another number of lanes and other speeds may be used. PPL 312 includes one or more SerDes/PCS (not shown) and PCIe media access control (MAC) Controller (not shown). In the ingress direction, the incoming packets pass through SerDes/PCS and MAC controller of PPL 312. The headers are decoded into individual fields and sent to the corresponding PPU 314. In the egress direction, PPL 312 receives packet headers and data information from PPU 314. PPL forms the packets (i.e. forms TLPs) and transmits them via the corresponding link 360 in a bit-stream format. PPU 314 parses the header information to determine the packet type and destination port (if the packet is to be forwarded to another port). For a packet ingressing via port 310, PPU sends the payload to memory 330 (in a manner as determined using scheduler 320) for temporary on-chip storage. In some embodiments, packet information (e.g. header information and the information regarding the location of the packet in memory 330) may be stored in port 310, for example in a virtual output queue (VOQ) described below.

Scheduler 320 allocates memory segments in banks of memory 330 and into which PPUs 314 to store packet segments. The specific scheduling processes (e.g. strict priority, weighted round robin) for packets that ingress switch 300 through a particular port 310 and egressing through various other ports 310 may also be selected by scheduler 320. As discussed with respect to method 200 and switch 100, scheduler 320 allocates memory such that a selected bank is identified to store the beginning packet segment, the beginning packet segment is stored in the selected bank, and subsequent packet segments are stored in the next adjacent banks. Scheduler 320 also controls retrieval of packet segments from memory 330 to be sent to an egress port 310.

Memory 330 has multiple banks configured such that packet segments from any of ports 310 may be stored in any bank. Thus, memory 330 may be coupled with ports 330 via a crossbar or analogous fabric of interconnections. Thus, memory 330 may be considered a multibank memory fabric. In some embodiments, memory 330 includes sixteen banks of memory. In other embodiments, another number of banks may be present. Each bank of memory 330 includes multiple memory segments. In some embodiments, each memory segment is a sixty-four byte segment. Other segment sizes, including variable memory segment sizes, may be used in some embodiments. In some embodiments, memory segments in a bank that store packet segments from the same packet need not be continuous. For example, if a bank stores two (or more) packet segments from the same packet in two memory segments, the two memory segments need not be contiguous. Thus, the two memory segments may be physically separated (i.e. not share a border) in the bank. In some embodiments, the two segments might share a border. In some embodiments, the packet segments are stored in a next available segment in a particular bank. Thus, the physical locations (e.g. addresses of memory segments) for two packet segments may or may not adjoin.

In operation, packets ingress switch 300 through ports 310. Packets are processed via PPLs 312 and PPUs 314. Scheduler 320 allocates memory 330 for packet segments to be stored in multiple banks of memory 330. PPUs 314 provide the packet segments to memory 330 for storage. Scheduler 320 determines a selected bank in which the beginning packet segment of a packet is stored. This beginning packet segment is stored in the selected bank. Scheduler 320 stores subsequent packet segments in order in the next adjacent bank. Thus, the second segment is stored in the bank next to the selected bank. The third packet segment is stored in the bank two banks away from the selected bank. This process continues until all packet segments have been stored. In some embodiments, scheduler 320 allocates memory in such a manner that memory allocation wraps around to the selected bank if there are more packet segments than memory banks.

Switch 300 shares the benefits of switch 100. Individual packets are stored across multiple banks of memory 330. As a result, memory utilization may be increased, transfer of packet across switch 300 may be improved and scheduler 320 may be more efficient.

Moreover, switch 300 may be used in conjunction with hosts (not shown in FIG. 3) and physical devices (not shown in FIG. 3) that are analogous to hosts 102 and physical devices 104. For example, hosts may be coupled with ports 310-0 through 310-7, while physical devices may be coupled with ports 310-8 through 310-15. Memory mapper 170 and fabric manager 160 may also be coupled with and provide mapping information to switch 300. Thus, operations provided by switch 100 may also be provided via switch 300. Consequently, memory in physical devices coupled with ports 310-8 through 310-15 may be shared by hosts coupled with ports 310-0 through 310-7. Multiple hosts may use a single physical device and a single host may use multiple physical devices. As a result, latencies and bottlenecks in memory usage may be reduced. Thus, storage and reading of data may be more efficient and performance may be improved.

Figure 4:
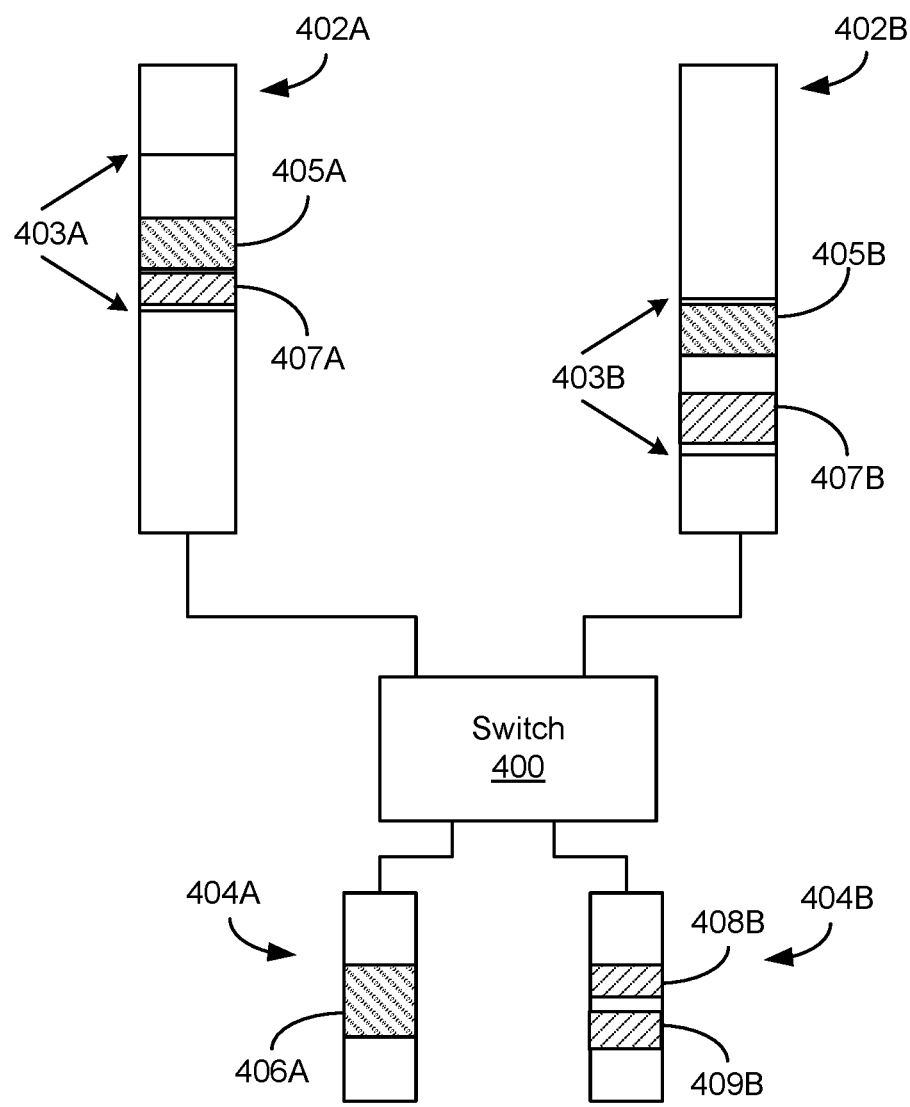
FIG. 4 depicts an embodiment of memory mapping for a switch usable with shared memory.

FIG. 4 depicts an embodiment of memory mapping for switch 400 usable with shared memory. Memory mapping is shown for switch 400, hosts 402A and 402B and physical devices 404A and 404B. Switch 400 corresponds to switch 100 and/or switch 300. Hosts 402A and 402B correspond to hosts 102. Physical devices 404A and 404B correspond to physical devices 104. Further, although two hosts 402A and 402B and two physical devices 404A and 404B are shown, another number of hosts and/or another number of physical devices may be present. The memory mapping in FIG. 4 depicts both sharing of a single physical device by multiple hosts and use of multiple physical devices by a single host. The memory mapping of FIG. 4 is for illustrative purposes and is not intended to limit the use of switches described herein.

Shown in FIG. 4 is the full memory space for host 402A and for host 402B. Thus, the full memory space is referred to as a host with respect to FIG. 4. Host 402A has host device memory (HDM) 403A. This corresponds to a range of memory locations for host 402A. Similarly, host 402B has HDM 403B that corresponds to a range of memory locations for host 402B. Within HDM 403A, one set or range of memory locations 405A is allocated to physical device 404A while set of memory locations 407A is allocated to physical device 404B. Similarly, within HDM 403B, one range of memory locations 405B is allocated to physical device 404A while another range of memory locations 407B is allocated to physical device 404B. In physical device 404A, corresponding memory locations 406A are allocated to memory locations 405A and 405B in hosts 402A and 402B, respectively. In physical device 404B, corresponding memory locations 406B are allocated to memory locations 407A in host 402A. Also in physical device 404B, corresponding memory locations 409B are allocated to memory locations 407B in host 402B.

As indicated in FIG. 4, hosts 402A and 402B share physical devices 404A and 404B. Further, single host 402A has corresponding memory locations 406A and 408B in multiple physical devices 404A and 404B, respectively. Similarly, single host 402B has corresponding memory locations 406A and 409B in multiple physical devices 404A and 404B, respectively. Further, hosts 402A and 402B share the same corresponding memory locations 406A in physical device 404A. As a result, hosts 402A and 402B may transfer information via physical device 404A. For example, host 402A may store data from memory locations 405A in corresponding memory locations 406A of physical device 404A. Host 402B may read the stored data from corresponding memory locations 406A into memory locations 405B. Thus, data may be transferred from memory locations 405A of host 402A to memory locations 405B of host 402B via physical device 404A. Although memory locations 405A, 405B, and 406B are indicated as having the same range length (e.g. all may be 512 MB), the ranges may differ. Stated differently, only a portion of the memory allocated in physical device 404A for host 402A may be accessible host 402B and/or vice versa.

In contrast, hosts 402A and 402B may not transfer data via physical device 404B. Hosts 402A and 402B share host 404B because each has corresponding memory locations 408B and 409B. However, corresponding memory locations 408B and 409B do not overlap. Thus, host 402A may store data for memory locations 407A in corresponding memory locations 408B. Host 402A may read data for memory locations 407A from corresponding memory locations 408B. Host 402B may store data for memory locations 407B in corresponding memory locations 409B. Similarly, host 402B may read data for memory locations 407B from corresponding memory locations 409B. However, host 402A cannot access memory locations 409B and host 402B cannot access memory locations 408B.

Thus, switch 400 may be used in conjunction with hosts 402A and 402B and physical devices 404A and 404B that are analogous to hosts 102 and physical devices 104. Multiple hosts 402A and 402B may use a single physical device 404A or 404B. Further, multiple hosts 402A and 402B may transfer data through a single physical device 404A. A single host 402A or 402B may use multiple physical devices 404A and 404B. As a result, latencies and bottlenecks in memory usage may be reduced. Thus, storage and reading of data may be more efficient and performance may be improved.

Figure 5:
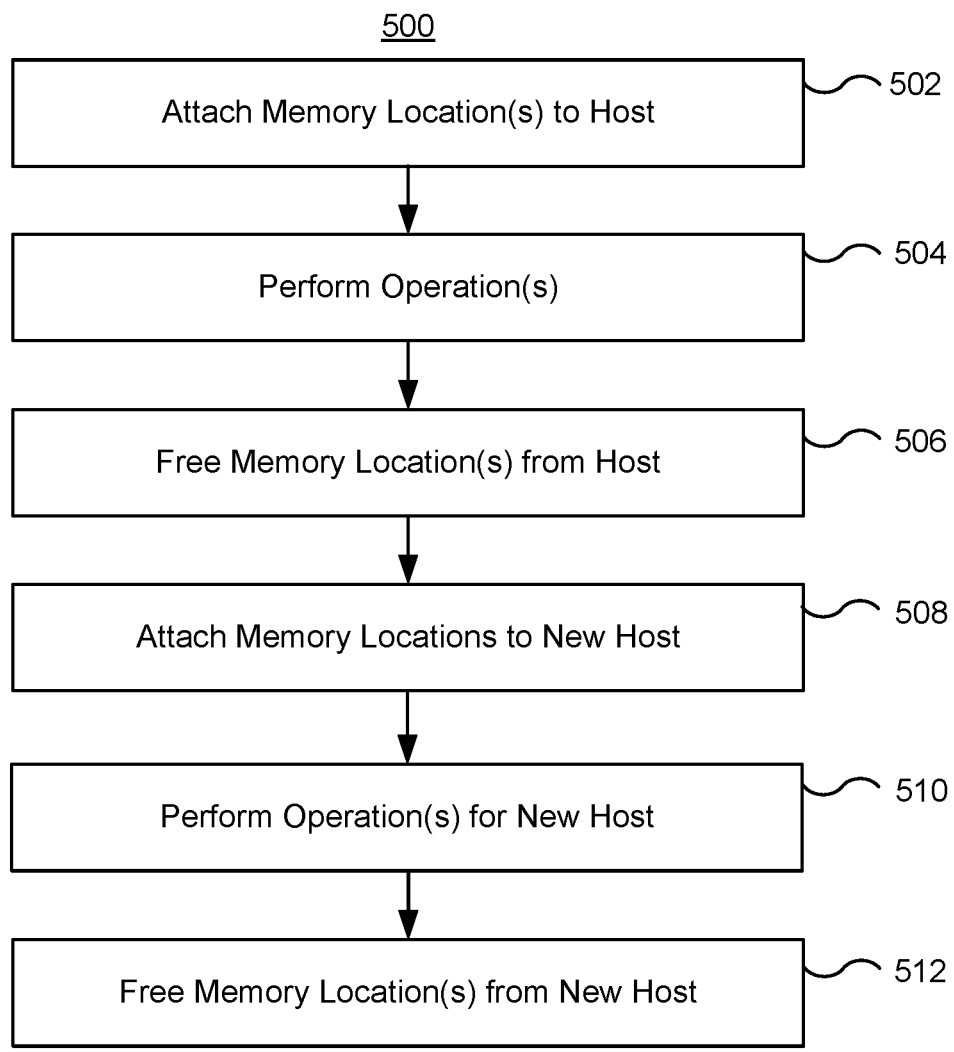
FIG. 5 is a flow-chart depicting an embodiment of a method for communicating via shared memory.

FIG. 5 is a flow-chart depicting an embodiment of method 500 for accessing shared memory. In particular, method 500 may be utilized in transferring data between hosts using a physical device. For simplicity, only some steps are shown. Further, portions of method 500 may be performed in another order, including but not limited to in parallel. Method 500 is also described in the context of a single switch 400, a particular number of hosts 402A and 402B, and a particular number of physical devices 404A and 404B. However, method 500 may be used for other switches, hosts, and/or physical devices as well as for other number(s) of switch(es), host(s) and/or physical devices. For simplicity, method 500 does not include determination of the corresponding memory locations for host memory. However, such operations may be performed in a manner analogous to that described in connection with FIGS. 1-4. In some embodiments, therefore, method 500 assumes that the corresponding memory locations in a physical device for memory locations for a host are known.

The corresponding memory locations in the physical device are attached to a first host, at 502. While attached, only the first host can access these corresponding memory locations. If these corresponding memory locations are also allocated to a second host, the second host cannot access these memory locations while the first host is attached. In some embodiments, 502 includes receiving mapping information from a memory mapper to translate host memory locations to corresponding memory locations of the physical device and attaching these corresponding memory locations.

The first host performs the desired operations for the corresponding memory locations, at 504. For example, the first host may read from and/or write to the corresponding memory locations. After the desired operations have been performed, the corresponding memory locations in the physical device are freed from the first host, at 506. In some embodiments, 508 includes receiving mapping information from a memory mapper to translate host memory locations to corresponding memory locations of the physical device and freeing these corresponding memory locations. Thus, the corresponding memory locations may be accessed by other hosts.

At 508 the corresponding memory locations are attached to the second host. In some embodiments, 508 includes receiving mapping information from a memory mapper to translate host memory locations for the second host to the corresponding memory locations of the physical device and attaching these corresponding memory locations. The first host (as well as any other hosts to which the corresponding memory locations were allocated) are no longer able to access these memory locations. The second host can perform operations on the corresponding memory locations, at 510. For example, the second host can read from the corresponding memory locations. Thus, data may be transferred from the first host to the second host. The second host may also write to the corresponding memory locations. After the desired operations are completed, the corresponding memory locations are freed, at 512. In some embodiments, 512 includes receiving mapping information from a memory mapper to translate host memory locations for the second host to the corresponding memory locations of the physical device and freeing these corresponding memory locations.

The processes of method 500 may be repeated to continue the exchange of data between the first and second hosts. Other host(s) to which the corresponding memory locations are allocated may also attach, perform operations on, and free the corresponding memory locations. Thus, other host(s) may also transfer data via the physical device.

For example, corresponding memory locations 406A may be attached to host 402B, at 502. As a result, host 402A cannot access corresponding memory locations 406A. At 504, data in memory locations 405B may be written to corresponding memory locations 406A. Host 402B frees corresponding memory locations 406A, at 506. At 508, host 402A attaches corresponding memory locations 406A. At 510, host 402A reads data from corresponding memory locations 406A and writes the data to memory locations 405A. Host 402A frees corresponding memory locations 406A, at 512. Data in memory locations 405B of host 402B may thus be transferred to memory locations 405A of host 402A via physical device 404A.

Thus, switch 400 may be used in conjunction with hosts 402A and 402B and physical devices 404A and 404B that are analogous to hosts 102 and physical devices 104. Multiple hosts 402A and 402B may use a single physical device 404A or 404B. Further, multiple hosts 402A and 402B may transfer data through a single physical device 404A. A single host 402A or 402B may use multiple physical devices 404A and 404B. Thus, storage, reading, and/or transfer of data may be more efficient, and performance may be improved.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a fabric manager;
   a memory mapper that receives and stores mapping information from the fabric manager that maps memory locations in a plurality of hosts to corresponding memory locations in a plurality of physical devices, the mapping information including at least one shared memory location for a host of the plurality of hosts and an other host of the plurality of hosts on a physical device of the plurality of physical devices, the physical device being a CXL memory device; and
   a switch that receives at least a portion of the mapping information from the memory mapper, receives a request from the host, receives an additional request from the other host, accesses memory that is identified by the request on the physical device, and accesses additional memory for the other host identified by the additional request on the physical device, the at least the portion of the mapping information including the at least one shared memory location, such that the host and the other host share the physical device including the at least one shared memory location;
   wherein the at least one shared memory location is accessible via the switch by only one of the host and the other host at a particular time.

2. The system of claim 1, wherein the at least the portion of the mapping information received by the switch maps a particular set of memory locations in the host to a corresponding set of corresponding memory locations in at least a first physical device and a second physical device of the plurality of physical devices.

3. The system of claim 1, wherein the request is a compute express link (CXL) request and the host is a CXL host.

4. The system of claim 1, wherein the switch is configured such that the host and the other host transfer information through the at least one shared memory location.

5. The system of claim 4, wherein the switch is configured to allow the other host to access the at least one shared memory location only if the at least one shared memory location is not attached to the host.

6. The system of claim 1, wherein the memory mapper includes an address table configured to translate between the memory locations in the plurality of hosts and the corresponding memory locations in the plurality of physical devices.

7. The system of claim 1, wherein the mapping information maps a portion of the physical device to each of the plurality of hosts.

8. A method, comprising:
   receiving, at a switch from a memory mapper, at least a portion of mapping information, the at least the portion of the mapping information being received at the memory mapper from a fabric manager, the memory mapper storing the mapping information, the mapping information maps memory locations in a plurality of hosts to corresponding memory locations in a plurality of physical devices, the at least the portion of the mapping information including at least one shared memory location for a host of the plurality of hosts and an other host of the plurality of hosts on a physical device of the plurality of physical devices, the physical device being a CXL memory device;
   receiving, at the switch, a request from the host;
   receiving, at the switch, an additional request from the other host;
   receiving, at the switch, additional mapping information from the memory mapper, the additional mapping information including the at least one shared memory location;
   accessing, via the switch and using the at least the portion of the mapping information, memory that is identified by the request on the physical device; and
   accessing, via the switch, additional memory for the other host identified by the additional request on the physical device;
   wherein the host and the other host share the physical device and the at least one shared memory location is accessible via the switch by only one of the host and the other host at a particular time.

9. The method of claim 8, wherein the at least the portion of the mapping information received by the switch maps a particular set of memory locations in the host to a corresponding set of corresponding memory locations in at least a first physical device and a second physical device of the plurality of physical devices.

10. The method of claim 8, wherein the request is a compute express link (CXL) request and the host is a CXL host.

11. The method of claim 8, wherein the switch is configured such that the host and the other host transfer information through the at least one shared memory location.

12. The method of claim 11, wherein the switch is configured to allow the other host to access the at least one shared memory location only if the at least one shared memory location is not attached to the host.

13. The method of claim 8, wherein the memory mapper includes an address table configured to translate between the memory locations in the plurality of hosts and the corresponding memory locations in the plurality of physical devices.

14. The method of claim 8, wherein the mapping information maps a portion of the physical device to each of the plurality of hosts.

15. A system, comprising:
   a plurality of hosts;
   a plurality of physical memory devices, a physical memory device of the plurality of physical memory devices being a CXL memory device;
   a fabric manager;
   a memory mapper that receives and stores mapping information from the fabric manager that maps memory locations in the plurality of hosts to corresponding memory locations in the plurality of physical memory devices, the mapping information including at least one shared memory location for a host of the plurality of hosts and an other host of the plurality of hosts on the physical memory device; and a switch, coupled with the plurality of hosts, the plurality of physical memory devices, the fabric manager, and the memory mapper, the switch being configured to receive at least a portion of the mapping information from the memory mapper, receives a request from the host, receives an additional request from the other host, accesses memory that is identified by the request on the physical memory device, and accesses additional memory for the other host identified by the additional request on the physical memory device;

wherein the host and the other host share the physical memory device including the at least one shared memory location and the at least one shared memory location is accessible via the switch by only one of the host and the other host at a particular time.

* * * * *

UNITED STATES PATENT AND TRADEMARK OFFICE
CERTIFICATE OF CORRECTION

PATENT NO. : 11,934,318 B2
APPLICATION NO. : 18/206564
DATED : March 19, 2024
INVENTOR(S) : Yan Fan, Kevin Rowett and Lawrence Hileman It is certified that error appears in the above-identified patent and that said Letters Patent is hereby corrected as shown below:

In the Specification

In Column 4, Lines 47-48, delete "In some embodiments, multiple"

Signed and Sealed this
Third Day of September, 2024

Katherine Kelly Vidal
*Director of the United States Patent and Trademark Office*